Aug. 18, 1925.
W. G. COGLEY
1,550,342
FOLIAGE TRIMMER
Filed July 18, 1924
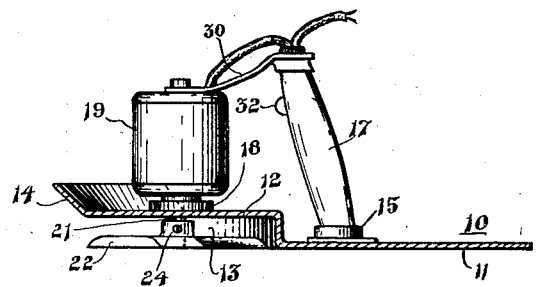
Fig. 1.
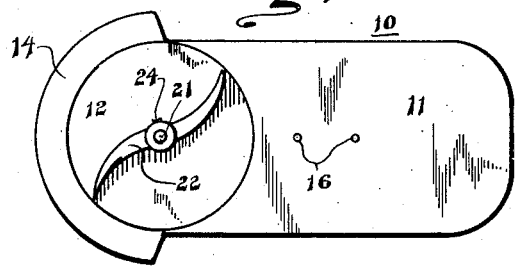
Fig. 2.
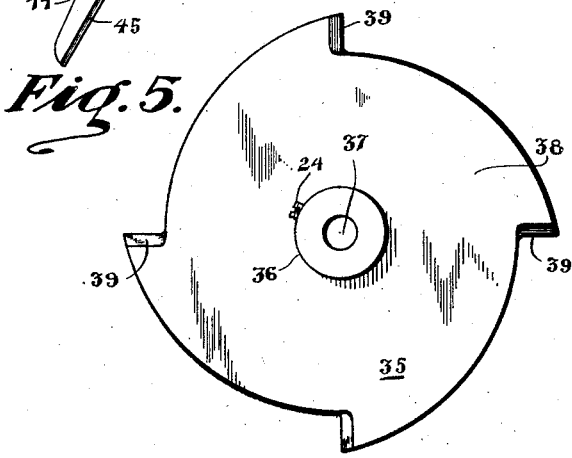
Fig. 5.
Fig. 3.
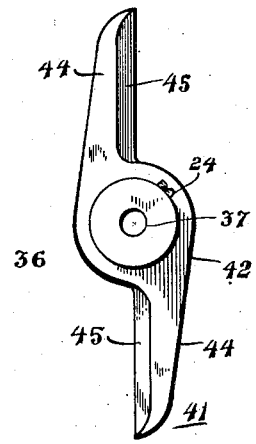
Fig. 4.
WITNESSES:
INVENTOR
Wm. G. Cogley
BY
ATTORNEY Patented Aug. 18, 1925.

1,550,342

UNITED STATES PATENT OFFICE.

WILLIAM G. COGLEY, OF MOORE, PENNSYLVANIA.

FOLIAGE TRIMMER.

Application filed July 18, 1924. Serial No. 726,783.

*To all whom it may concern:*

Be it known that I, WILLIAM G. COGLEY, a citizen of the United States, and a resident of Moore, in the county of Delaware and State of Pennsylvania, have invented a new and useful Improvement in Foliage Trimmers, of which the following is a specification.

My invention relates to foliage trimmers, or vegetation cutter, more particularly to those used for clipping hedges or trimming grass and has for an object to provide an apparatus in which a rapidly rotating cutter or cutters strikes the foliage to be cut.

A further object of my invention is to provide a trimmer having a guide to rest on the part already cut and thus ensure that the surface so cut is even, and of pleasing appearance.

A still further object of my invention is to provide a trimmer which will be light, durable, simple in construction and of easy operation.

These and other objects of my invention, which are more manifest in the further description thereof, may be attained by the employment of apparatus illustrated in the accompanying drawing, in which Fig. 1 is a side view of the trimmer showing the shield in section; Fig. 2 is a bottom plan view; and Figs. 3, 4 and 5 are plan views of modified cutters.

Similar reference characters are employed to designate corresponding parts throughout.

My trimmer consists of a shield 10, composed of a flat guide portion 11, a circular portion 12 secured to the guide section by a semi-cylindrical portion 13 and a flaring guard portion 14.

A collar 15 is secured to the guide portion by any suitable means, such for example, as the rivets 16, and forms a seat for the handle 17. On the top of the circular section is a motor pedestal 18 upon which is mounted the motor 19 which may be of any convenient type. While I have shown an electric motor, it is to be understood that any other form of motor, such for example, as a compressed air motor or any form of prime mover is within the scope of my invention.

The motor drives a shaft 21 which extends through the circular portion and carries at its lower end a cutter 22, the cutter being attached to the shaft by any suitable means, such for example, as a set screw. The motor should be of a type to operate at a speed of the order of 4,000 to 6,000 revolutions per minute.

The top of the motor is connected to the handle by a brace 30. Within the handle is a motor control means, such for example, as an electric switch, which is controlled by a suitable push button 32.

The operation of the device is as follows: In trimming hedges the trimmer is held in the hand and the push button depressed, allowing motive power to flow to the motor. The cutter revolves at a high speed and the device is advanced so that the revolving cutter comes in contact with the hedge at the plane in which the cut is to be made. The speed of the cutter is such that the foliage of the hedge is cut by the blow, due to the fact that the inertia and the rigidity thereof offer sufficient resistance to prevent the foliage giving before the cutter has traveled past the point in which the foliage originally lay. Due to this high speed it is not necessary to provide anything on the side of the foliage opposite to the cutter, and the trimmer will function satisfactorily on the most flexible foliage.

After the trimming has been started the guide portion 11 of the shield rests on and is guided by the part already cut and as the cutter 22 is level with the guide portion the operator will be able to keep the trimmed surface even.

In trimming grass, as around trees, in corners, etc., the shield is rested on or guided directly by the matted growth of the lawn.

In Fig. 3, I show a cutter 35 of the disc type comprising a disc 38 having a collar 36 provided with an opening 37 through which the shaft 21 projects, the cutter being held on the shaft by the set screw 24. The disc is provided on its periphery with knives 39.

In Fig. 4, I show a cutter 41 for use in cutting heavier material. The collar 36, provided with the opening 37 and the set screw 24 rests on and is secured to a forging consisting of a main portion 42 and laterally and oppositely extending blades 44 having beveled cutting edges 45.

In Fig. 5, I show a form of cutter 46 having a collar 36 encircling opening 37 in which the shaft 21 is held by set screw 24. Three knives 44, each provided with cutting edges 45 radiate from the central portion 42 upon which the collar 36 is mounted.

It should of course be understood that I may also employ a plurality of cutters driven by one or more motors mounted on a single frame.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. A trimmer of the class described comprising a shield, having a guide portion and an upwardly flaring guard portion and a rotatable cutter mounted on the shield for rotation in the plane of the guide portion.

2. A shield for a foliage trimmer consisting of a flat guide portion and a circular section parallel to the guide portion and connected thereto by a semi-cylindrical portion.

3. A shield for a foliage trimmer consisting of a flat guide portion, a circular section parallel to the guide portion and connected thereto by a semi-cylindrical portion, and a flaring guard portion.

4. A hedge trimmer comprising a motor having a shaft, a blade carrying cutter mounted on said shaft, and a supporting member for said motor, said motor supporting member having a portion for engaging the trimmed portion of the hedge whereby the cutter is held in proper position with respect to the untrimmed portion of the hedge.

5. In a foliage trimmer, the combination with a shield having a guide portion and a circular portion parallel with the guide portion, a motor mounted on said circular portion, a rotatable cutter in the plane of the guide portion and a shaft connecting said motor and said cutter.

6. A foliage trimmer, comprising a rotatable cutter or cutters, means for rotating said cutter or cutters, and guide means in the plane of rotation of said cutter or cutters adapted to rest on the surface over which the cutter or cutters has passed, said guide means being spaced from said cutter or cutters in said plane of rotation.

7. In a foliage trimmer, the combination with a rotating cutter and means for rotating the same, of a flat guide means in the plane of rotation of said cutter, said guide means being rigidly attached to said rotating means, and being spaced from said cutter in said plane of rotation.

8. A foliage trimmer comprising a flat guide member, a motor supporting member attached thereto, a motor on said support, a shaft extending from the motor toward the plane of the guide member, said shaft being adapted to receive any one of a plurality of cutters and to rotate the same in the plane of the guide member, and a guard member extending from said motor supporting member.

9. A foliage trimmer comprising a frame member, a motor mounted thereon, a shaft extending from the motor through the frame member, a rotatable cutter mounted on said shaft, and a handle on said frame member, said frame member comprising a guide portion and an upwardly extending guard portion.

10. A foliage trimmer comprising a frame member, a motor mounted thereon, a shaft extending from the motor through the frame member, a rotatable cutter mounted on said shaft, and a handle on said frame member, said handle and said motor being connected at the top by a stiffening member.

11. A foliage trimmer comprising a shield having a flat guide portion, a circular portion and a flaring guard portion, a motor mounted on said circular portion, a rotatable cutter operatively connected to said motor, a handle secured to said shield and motor control means attached to said handle.

12. A foliage trimmer comprising a shield having a flat guide portion, a flat circular portion connected thereto by a semi-cylindrical portion, and an upwardly flaring guard portion, a motor pedestal on said circular portion, a motor mounted thereon, a shaft extending from said motor through said pedestal and said shield, and carrying a rotatable cutter, a handle extending upwardly from said guide portion, and a brace connecting the upper part of said handle to the motor.

13. A foliage trimmer comprising a shield having a flat guide portion, a flat circular portion connected thereto by a semi-cylindrical portion, and an upwardly flaring guard portion, a motor pedestal on said circular portion, a motor mounted thereon, a shaft extending from said motor through said pedestal and said shield, and carrying a rotatable cutter, a handle extending upwardly from said guide portion, and a brace connecting the upper part of said handle to the motor, said handle having motor control means contained therein.

14. A foliage trimmer comprising a frame member, a motor mounted thereon, a rotatable cutter detachably secured to the shaft of said motor, a handle secured to said motor and said frame member and motor control means in said handle.

15. A trimmer of the class described comprising a shield having a guide portion, a motor supporting portion spaced above said guide portion and a guard extending from said motor supporting portion, a motor mounted on said motor supporting portion, a shaft extending from said member through said shield and carrying a rotatable cutter, the plane of rotation of said cutter coinciding with the plane of the guide portion.

In testimony whereof I have hereunto subscribed my name this 15th day of July, 1924.

WILLIAM G. COGLEY.